(12) United States Patent
Saijo et al.

(10) Patent No.: US 12,719,137 B2
(45) Date of Patent: Aug. 25, 2026

(54) BATTERY CELL

(71) Applicant: HONDA MOTOR CO., LTD., Tokyo (JP)

(72) Inventors: Yasuhiko Saijo, Saitama (JP); Yuriko Asahi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 611 days.

(21) Appl. No.: 18/051,520

(22) Filed: Nov. 1, 2022

(65) Prior Publication Data

US 2023/0163426 A1 May 25, 2023

(30) Foreign Application Priority Data

Nov. 25, 2021 (CN) ........................ 202111412042.2

(51) Int. Cl.
*H01M 50/533* (2021.01)
*H01M 50/227* (2021.01)
*H01M 50/567* (2021.01)

(52) U.S. Cl.
CPC ....... *H01M 50/533* (2021.01); *H01M 50/227* (2021.01); *H01M 50/567* (2021.01)

(58) Field of Classification Search
CPC . H01M 50/533; H01M 50/567; H01M 50/227
See application file for complete search history.

(56) References Cited

U.S. PATENT DOCUMENTS 4,636,445 A * 1/1987 Yamano ................ H01M 4/242 429/59
5,419,982 A 5/1995 Tura et al.
5,871,861 A * 2/1999 Hirokou .............. H01M 10/654 429/149
2001/0051298 A1 * 12/2001 Hanafusa ........... H01M 50/105 429/162
2004/0224227 A1 11/2004 Ozawa et al.
(Continued)

FOREIGN PATENT DOCUMENTS

CN 203071157 U 7/2013
CN 206163634 U 5/2017
(Continued)

OTHER PUBLICATIONS

KR 10-1805232 Dec. 5, 2017 Machine Translation (Year: 2017).*
Office Action issued Apr. 24, 2025 in the CN Patent Application No. 202111412042.2.
(Continued)

*Primary Examiner* — Galen H Hauth
(74) *Attorney, Agent, or Firm* — CKC & Partners Co., LLC

(57) ABSTRACT

An object is to provide a battery cell which can prevent current collectors from being damaged or cut and can reliably ensure conductivity between the current collectors and a terminal. A battery cell is provided which includes a power generation element that includes a plurality of current collectors; and a terminal that is extended in a stacking direction of the current collectors and is electrically connected to the current collectors, and in which the terminal is inserted into holes formed in the current collectors, bent portions are formed at abutment parts of the current collectors that abut on the terminal and a distance holder is arranged between the current collectors and around the abutment parts.

2 Claims, 5 Drawing Sheets

(56) References Cited

U.S. PATENT DOCUMENTS

| | | | | |
|---|---|---|---|---|
| 2005/0271933 | A1* | 12/2005 | Matsumoto | H01M 50/534 429/127 |
| 2009/0047580 | A1* | 2/2009 | Takagi | H01M 10/0585 429/246 |
| 2010/0028769 | A1 | 2/2010 | Enomoto et al. | |
| 2010/0173194 | A1* | 7/2010 | Fujiya | H01M 50/557 156/252 |
| 2011/0129711 | A1 | 6/2011 | Ahn et al. | |
| 2012/0244423 | A1 | 9/2012 | Kusukawa et al. | |
| 2013/0177788 | A1* | 7/2013 | Hasegawa | H01M 10/0413 429/62 |
| 2019/0081313 | A1* | 3/2019 | Wyser | A61N 1/378 |
| 2020/0330774 | A1* | 10/2020 | Louwagie | A61N 1/3758 |
| 2021/0098768 | A1 | 4/2021 | Imabori | |

FOREIGN PATENT DOCUMENTS

| | | | |
|---|---|---|---|
| CN | 110785870 | A | 2/2020 |
| CN | 210040380 | U | 2/2020 |
| CN | 111211285 | A | 5/2020 |
| CN | 112599938 | A | 4/2021 |
| CN | 112886149 | A | 6/2021 |
| JP | 2008159592 | A | 7/2008 |
| JP | 2010027494 | A | 2/2010 |
| KR | 20070049255 | A | 5/2007 |

OTHER PUBLICATIONS

AshahiKasei Engineering Plastics retrieved from https://www.asahi-kasei-plastics.com/en/column/07/ on Jul. 31, 2025.

Office Action issued Aug. 8, 2025 in the U.S. Appl. No. 18/051,518.

* cited by examiner

BATTERY CELL

This application is based on and claims the benefit of priority from Chinese Patent Application No. 202111412042.2, filed on 25 Nov. 2021, the content of which is incorporated herein by reference.

BACKGROUND OF THE INVENTION

Field of the Invention

The present invention relates to battery cells.

Related Art

Conventionally, secondary batteries such as a lithium-ion secondary battery which have a high energy density are widely spread. In recent years, in terms of improving energy efficiency, reducing negative impacts on the global environment by increasing the share of renewable energy and reducing $CO_2$, the use of secondary batteries has been considered for various applications such as in-vehicle use. A secondary battery has a structure in which a solid electrolyte (separator) is provided between a positive electrode and a negative electrode and which is filled with a liquid or solid electrolyte (electrolytic solution).

In a lithium-ion secondary battery using any one of a liquid electrolyte and a solid electrolyte, a positive electrode including a positive electrode current collector, the electrolyte and a negative electrode including a negative electrode current collector are repeatedly stacked. Then, in each of the positive electrode and the negative electrode, a plurality of current collectors are drawn in the same direction, are then bundled and are thereafter connected to a lead terminal (see, for example, Patent Document 1).

When as in a technique disclosed in Patent Document 1, a plurality of current collectors are bundled and connected to a lead terminal, since the foil-shaped current collectors are bent to generate stress, the current collectors may be damaged or cut by vibrations or the like. Hence, it is considered that the current collectors are individually brought into contact with the lead terminal which is extended in the stacking direction of the current collectors.

Examples of a technique for bringing the current collectors into contact with the lead terminal which is extended in the stacking direction of the current collectors include a method of collecting the bundled current collectors at one end portion in the stacking direction, extending the lead terminal to the portion alone and bringing the lead terminal into contact with the current collectors (see, for example, Patent Document 2).

Patent Document 1: Japanese unexamined Patent Application, Publication No. 2008-159592

Patent Document 2: Japanese Unexamined Patent Application, Publication No. 2010-027494

SUMMARY OF THE INVENTION

In a technique disclosed in Patent Document 2, as in the technique disclosed in Patent Document 1, a plurality of current, collectors are collected to be bent by an amount corresponding to a coating thickness, with the result that the current collectors may be damaged or cut. Disadvantageously, if a terminal is inserted into holes formed in current collectors, and an axial force is only generated by a rivet to press the current collectors to the terminal, only an end surface of the current collectors is brought into contact with the terminal, with the result that it is likely that conductivity between the current collectors and the terminal cannot be reliably ensured.

The present invention is made in view of the problem described above, and an object thereof is to provide a battery cell which can prevent current collectors from being damaged or cut and can reliably ensure conductivity between the current collectors and a terminal.

(1) The present invention relates to a battery cell which includes: a power generation element that includes a plurality of current collectors; and a terminal that is extended in a stacking direction of the current collectors and is electrically connected to the current collectors, and in which the terminal is inserted through holes formed in the current collectors, bent portions are formed at abutment parts of the current collectors that abut on the terminal and a distance holder is arranged between the current collectors and around the abutment parts.

According to the invention of (1), it is possible to provide a battery cell which can prevent the current collectors from being damaged or cut and can reliably ensure conductivity between the current collectors and the terminal.

(2) The battery cell described in (1) which includes: an exterior that includes a hole into which the terminal is inserted, and in which an end portion of the terminal in the stacking direction is extended outside the exterior.

According to the invention of (2), an electrode for the battery cell can be provided at the end portion in the stacking direction of the current collectors.

(3) The battery cell described in (2) in which a bent portion is formed at an abutment part of an end surface of the hole in the exterior that abuts on the terminal.

According to the invention of (3), it is possible to enhance the sealing property of the exterior.

(4) The battery cell described in (3) in which the amount of bending in the bent portion of the exterior is smaller than the amount of bending in one of the bent portions of one of the current collectors.

In the invention of (4), the entry of the exterior between the current collector and the terminal can be prevented, and thus it is possible to reliably bring the current collector into contact with the terminal.

(5) The battery cell described in (3) or (4) in which one of the end portions of the terminal in the stacking direction that, is arranged outside the exterior is larger in diameter than the terminal arranged within the exterior, and in which a lead terminal or a gap filler is arranged between the end portion of the terminal and the exterior.

According to the invention of (5), a current, is easily extracted from the battery cell, and it is possible to enhance the sealing property of the exterior.

(6) The battery cell described in (5) in which the end portion of the terminal and the lead terminal or the second distance holder are fitted together with any one of a concavo-convex portion, a screw shape and a rivet.

According to the invention of (6), it is possible to further enhance the sealing property of the exterior.

(7) The battery cell described in (1) which includes the exterior that stores the power generation element and the terminal therewithin, and in which the exterior includes a conductive layer on an abutment surface that abuts on a stacking end surface of the power generation element.

According to the invention of (7), it is possible to reduce the resistance of the battery cell and to enhance airtightness.

(8) The battery cell described in (7) in which the exterior includes a resin layer, that covers an outer perimeter of the conductive layer on the abutment surface, and in which the conductive layer on the abutment surface is larger in area than the resin layer on the abutment, surface.

According to the invention of (8), it is possible to reduce the resistance of the battery cell and to enhance airtightness.

BRIEF DESCRIPTION OF THE DRAWINGS

FIG. 2 is a cross-sectional view taken along line A-A in FIG. 1;

DETAILED DESCRIPTION OF THE INVENTION

Embodiments of the present invention will be described below with reference to drawings. The details of the present invention are not limited to the following embodiments. Although in the following embodiments, a battery cell is described as a lithium-ion solid secondary battery, the present invention is not limited to the configuration described above, and the present invention can also be applied to solid secondary batteries other than the lithium-ion secondary battery.

First Embodiment

<Overall Configuration of Battery Cell>

Figure 1:
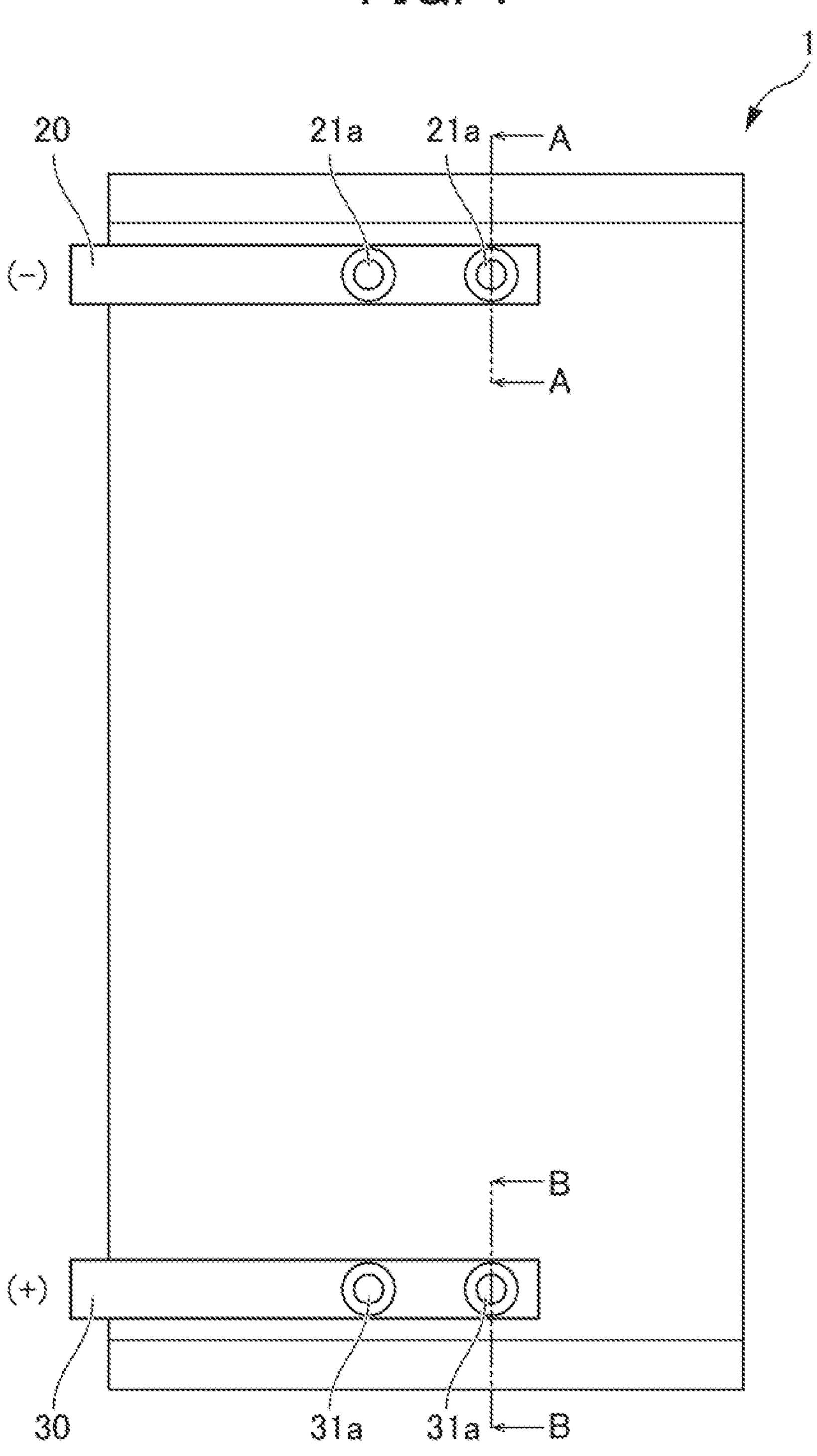
FIG. 1 is a top view of a battery cell according to a first, embodiment of the present invention.
Figure 2:
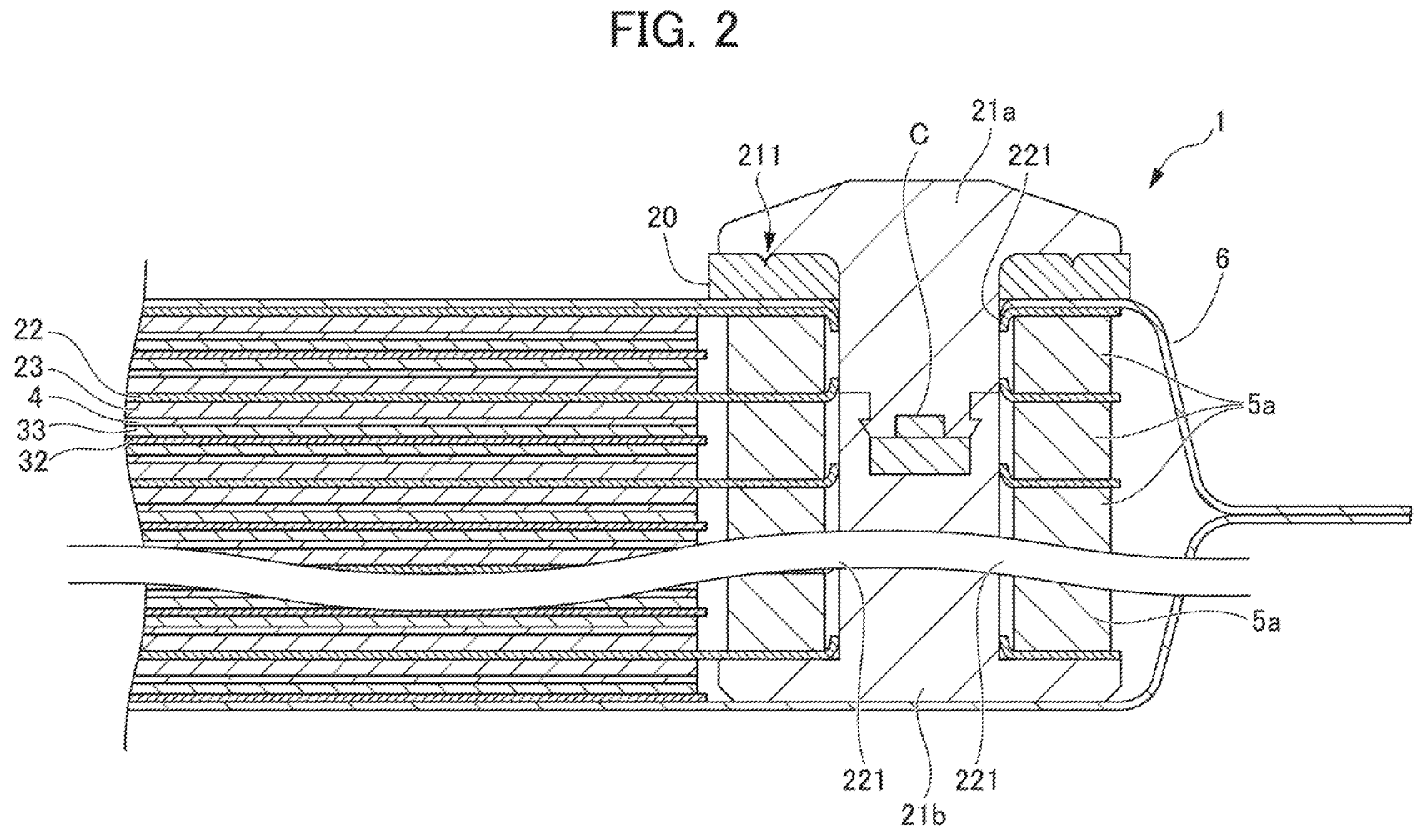
Figure 3:
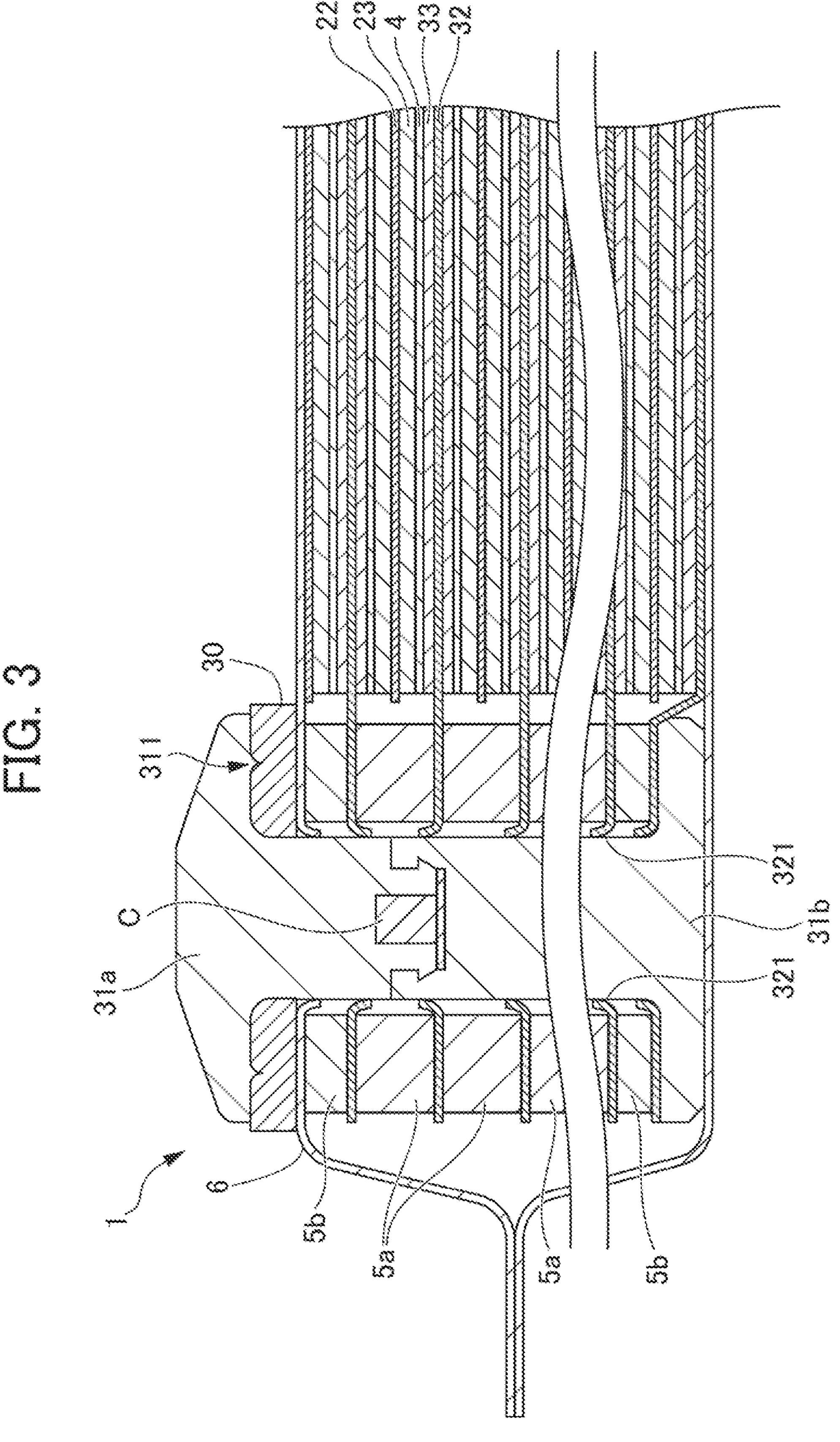
FIG. 3 is a cross-sectional view taken along line B-B in FIG. 1.

As shown in FIGS. 1 to 3, a battery cell 1 according to the present embodiment includes a negative electrode lead terminal 20 and a positive electrode lead terminal 30 serving as lead terminals, and an exterior 6. As shown in FIGS. 2 and 3, the battery cell 1 includes, as a power generation element, a multilayer in which negative electrode current collectors 22, negative electrode active material layers 23, solid electrolyte layers 4, positive electrode current collectors 32 and positive electrode active material layers 33 stored within the exterior 6 are stacked. As shown in FIG. 2, a plurality of negative electrode current collectors 22 are drawn from the end surface of the multilayer in the same direction to individually abut on a negative electrode terminal 21*a* or 21*b*. Likewise, as shown in FIG. 3, a plurality of positive electrode current collectors 32 are drawn from the end surface of the multilayer in the same direction to individually abut on a positive electrode terminal 31*a* or 31*b*.

In the multilayer serving as the power generation element, on both surfaces of each of the negative electrode current collectors 22, the negative electrode active material layers 23 are stacked, and on the surfaces of each of the positive electrode current collectors 32, the positive electrode active material layers 33 are stacked. These may be separate layers or the current collectors and the active material layers may be integrally formed. The solid electrolyte layer 4 is stacked between the negative electrode current collector 22 and the negative electrode active material layer 23, and between the positive electrode current collector 32 and the positive electrode active material layer 33. A plurality of stacking units described above may be repeatedly stacked, and the number of layers stacked is not particularly limited.

[Negative Electrode Current Collector]

The negative electrode current collector 22 is not particularly limited, and a known current collector which can be used for the negative electrode of a secondary battery can be applied. As the negative electrode current collector 22, a foil-shaped metal foil is used. Examples thereof include metal foils such as a stainless steel (SUS) foil and a copper (Cu) foil.

[Negative Electrode Active Material Layer]

The negative electrode active material of the negative electrode active material layer 23 is not particularly limited, and a known material used as a negative electrode active material for a secondary battery can be applied. The composition thereof is also not particularly limited, and may include a solid electrolyte, a conductivity aid, a binder and the like. Examples of the negative electrode active material include metal lithium, lithium alloys such as a Li—Al alloy and a Li—In alloy, lithium titanates such as $Li_4Ti_5O_{12}$, carbon materials such as carbon fiber and graphite and the like.

[Positive Electrode Current Collector]

The positive electrode current collector 32 is not particularly limited and a known current collector which can be used for the positive electrode of a secondary battery can be applied. As the positive electrode current collector 32, a foil-shaped metal foil is used. Examples thereof include metal foils such as a stainless steel (SUS) foil and an aluminum (Al) foil.

[Positive Electrode Active Material Layer]

The positive electrode active material of the positive electrode active material layer 33 is not particularly limited, and a known material used as a positive electrode active material for a secondary battery can be applied. The composition thereof is also not particularly limited, and may include a solid electrolyte, a conductivity aid, a binder and the like. Examples of the positive electrode active material include transition metal chalcogenides such as titanium disulfide, molybdenum disulfide and niobium selenide, transition metal oxides such as lithium nickelate ($LiNiO_2$), lithium manganate ($LiMnO_2$, $LiMd_2O_4$) and lithium cobaltate $LiCoO_2$) and the like.

[Negative Electrode Terminal and Positive Electrode Terminal]

The negative electrode terminals 21*a* and 21*b* are conductive members which are substantially cylindrical, and are formed with, for example, two members which are coupled within the exterior 6 through a coupling member C. The negative electrode terminals 21*a* and 21*b* are extended in the stacking direction of a plurality of negative electrode current collectors 22 in the multilayer, and are electrically connected to the negative electrode current collectors 22 drawn from the multilayer within the exterior 6. One end portion of the negative electrode terminal 21*a* is arranged outside the exterior 6, and is larger in diameter than the negative electrode terminal 21*a* arranged within the exterior 6. The configuration of the negative electrode terminal is not limited to the configuration using the two members described above, and may be a configuration using one member. However, by forming the negative electrode terminal of two members, the negative electrode terminal can be easily inserted into holes formed in the negative electrode current collectors 22 and be fixed.

Between the one end portion of the negative electrode terminal 21*a* and the exterior 6, the negative electrode lead terminal 20 serving as the lead terminal is arranged. The negative electrode lead terminal 20 is fitted with a concavo-convex portion 211 to the negative electrode terminal 21*a*. In this way, the sealing property of the multilayer described above can be enhanced. Instead of the negative electrode lead terminal 20, a gap filler which is a separate member may be arranged. The gap filler described above is not particularly limited as long as it can be electrically connected to the negative electrode lead terminal 20 and the negative electrode terminal 21*a* and is conductive. The negative electrode lead terminal 20 and the negative electrode terminals 21 may be fitted together with a screw shape or a rivet instead of the concavo-convex portion described above.

The positive electrode terminals 31*a* and 31*b* have the same configuration as the negative electrode terminals 21*a* and 21*b*.

[Solid Electrolyte Layer]

Although the solid electrolyte of the solid electrolyte layer 4 is not particularly limited, examples thereof include sulfide solid electrolyte materials, oxide solid electrolyte materials, nitride solid electrolyte materials, halide solid electrolyte materials and the like.

[Lead Terminal]

The negative electrode lead terminal 20 and the positive electrode lead terminal 30 are not particularly limited, and are preferably a linear plate-shaped member of aluminum (Al), copper (Cu) or the like which is flexible.

[Exterior]

The exterior 6 stores the multilayer which is the power generation element. Intrusion of air and moisture into the multilayer can be prevented by the exterior 6. The exterior 6 is formed with, for example, a laminate film including an inorganic thin film such as an aluminum foil and a resin layer and the like.

<Connection Structure of Current Collectors and Terminals>

As shown in FIG. 2, in a plurality of negative electrode current collectors 22 drawn from the end surface of the multilayer, holes into which the negative electrode terminals 21*a* and 21*b* are inserted are formed. In a state before the negative electrode terminals 21*a* and 21*b* are inserted, the holes formed in the negative electrode current collectors 22 are smaller in diameter than the negative electrode terminals 21*a* and 21*b* arranged within the exterior 6. The negative electrode terminals 21*a* and 21*b* are inserted into the holes formed in the negative electrode current collectors 22 while the diameters of the holes are being pressed and expanded. In this way, bent portions 221 are formed at abutment parts of the negative electrode current collectors 22 which abut on the negative electrode terminals 21*a* and 21*b*.

Since the diameters of the holes formed in the negative electrode current collectors 22 which are metal foils are pressed and expanded, and thus the bent portions 221 are formed, the bent portions 221 have stress acting in a direction in which the negative electrode current collectors 22 abut on the negative electrode terminals 21*a* and 21*b*. In this way, it is possible to increase the contact areas of the negative electrode current collectors 22 and the negative electrode terminals 21*a* and 21*b*, as well as to reliably bring the negative electrode current collectors 22 into contact with the negative electrode terminals 21*a* and 21*b*, which makes it possible to reliably ensure conductivity between the negative electrode current collectors 22 and the negative electrode terminals 21*a* and 21*b*. Although in FIGS. 1 to 3, the bent portions 221 are formed around the end portions of the negative electrode current collectors 22 of the metal foils on a short side, the bent portions 221 may be formed around the end portions of the negative electrode current collectors 22 of the metal foils on a long side. In this way, a current distribution can be made uniform.

In the exterior 6, a hole into which the negative electrode terminal 21*a* is inserted is formed. In a state before the negative electrode terminal 21*a* is inserted the hole formed in the exterior 6 is smaller in diameter than the negative electrode terminal 21*a* formed within the exterior 6. The negative electrode terminal 21*a* is Inserted into the hole formed in the exterior 6 while the diameter of the hole formed in the exterior 6 is being pressed and expanded. In this way, a bent portion is formed at an abutment part of the end surface of the hole which abuts on the negative electrode terminal 21*a*. Hence, it is possible to reliably bring the end surface of the hole into contact with the negative electrode terminal 21*a*. Although conventionally, for example, moisture permeates a part where the exterior formed with a laminate film and the like and a metal terminal extended from an end portion of the exterior are thermally welded, and this contributes to a decrease in the life of the battery cell, the configuration described above makes it possible to enhance the sealing property of the exterior 6, with the result that it is possible to increase the life of the battery cell.

Moreover, the amount of bending in the bent portion formed in the exterior 6 is preferably smaller than the amount of bending in the bent portions 221 formed in the negative electrode current collectors 22. In this way, in the adjacent negative electrode current collectors 22 within the exterior 6, the entry of the exterior 6 between the negative electrode terminal 21*a* and the negative electrode current collectors 22 can be prevented, and thus it is possible to reliably ensure conductivity between the negative electrode terminal 21*a* and the negative electrode current collectors 22. The configuration described above can be achieved by decreasing the diameters of the holes formed in the negative electrode current collectors 22 in the state before the negative electrode terminal 21*a* is inserted as compared with the diameter of the hole formed in the exterior 6.

As shown in FIG. 2, shims 5*a* serving as distance holders are arranged between the negative electrode current collectors 22 drawn from the end surface of the multilayer and around the bent portions 221 serving as abutment portions which abut on the negative electrode terminals 21*a* and 21*b*. The thickness of the shim 5*a* in the stacking direction is substantially equal to the distance between the adjacent negative electrode current collectors 22 in the multilayer. Hence, the negative electrode current collectors 22 drawn from the end surface of the multilayer can be arranged substantially parallel to each other without being bent at parts other than the bent portions 221 of the abutment parts which abut on the negative electrode terminals 21*a* and 21*b*. In this way, it is possible to prevent the negative electrode current collectors 22 from being damaged and cut.

As shown in FIG. 3, in a plurality of positive electrode current collectors 32 drawn from the end surface of the multilayer, holes into which the positive electrode terminals 31*a* and 31*b* are inserted are formed. The positive electrode current collectors 32 and the positive electrode terminals 31*a* and 31*b* have the same configurations as the negative electrode current collectors 22 and the negative electrode terminals 21*a* and 21*b*, and bent portions 321 are formed at abutment parts of the positive electrode current collectors 32 which abut on the positive electrode terminals 31*a* and 31*b*. In this way, the same effects as in the negative electrode current collectors 22 and the negative electrode terminals 21*a* and 21*b* can be obtained.

As shown in FIG. 3, the shims 5*a* serving as the distance holders are arranged between the positive electrode current collectors 32 drawn from the end surface of the multilayer and around the bent portions 321. The thickness of the shim

5*a* is substantially equal to the distance between the adjacent positive electrode current collectors 32 in the multilayer. On the other hand, since in the multilayer of the present embodiment, the negative electrode current collector 22 is arranged at an end portion in the stacking direction on the side of the positive electrode terminal 31*a*, a shim 5*b* is arranged, in this part, between the exterior 6 and the positive electrode current collector 32. The thickness of the shim 5*b* is smaller than that of the shim 5*a*. Since at an end portion in the stacking direction on the side of the positive electrode terminal 31*b*, an end portion of the positive electrode terminal 31*b* having a predetermined thickness on the side of the exterior 6 is sealed into the exterior 6, the shim 5*b* having a smaller thickness than the shim 5*a* is arranged between the positive electrode current collectors 32 at the end portion in the stacking direction on the side of the positive electrode terminal 31*b*.

<Battery Module>

When a plurality of battery cells 1 having the configuration described above are combined to form a battery module, the battery cells 1 are arranged such that the negative electrode lead terminals 20 and the positive electrode lead terminals 30 which are arranged to be extended in the stacking direction of the multilayer are aligned side by side, with the result that the battery module can be formed without the formation of wasting space. Here, the negative electrode lead terminals 20 and the positive electrode lead terminals 30 in the battery cells 1 are preferably arranged in a staggered arrangement when they are seen in plan view from the stacking direction of the multilayer. When in the use of the battery module, each of the battery cells 1 may be expanded to cause a change in thickness, since in the configuration described above, the positions of the positive electrode lead terminals 30 whose thicknesses are easily changed can be dispersed, the thicknesses of the battery modules can be made uniform.

Second Embodiment

A second embodiment of the present invention will then be described. Configurations common to the first embodiment may be identified with the same reference numerals in drawings, and descriptions thereof may be omitted.

[Exterior]

Figure 4:
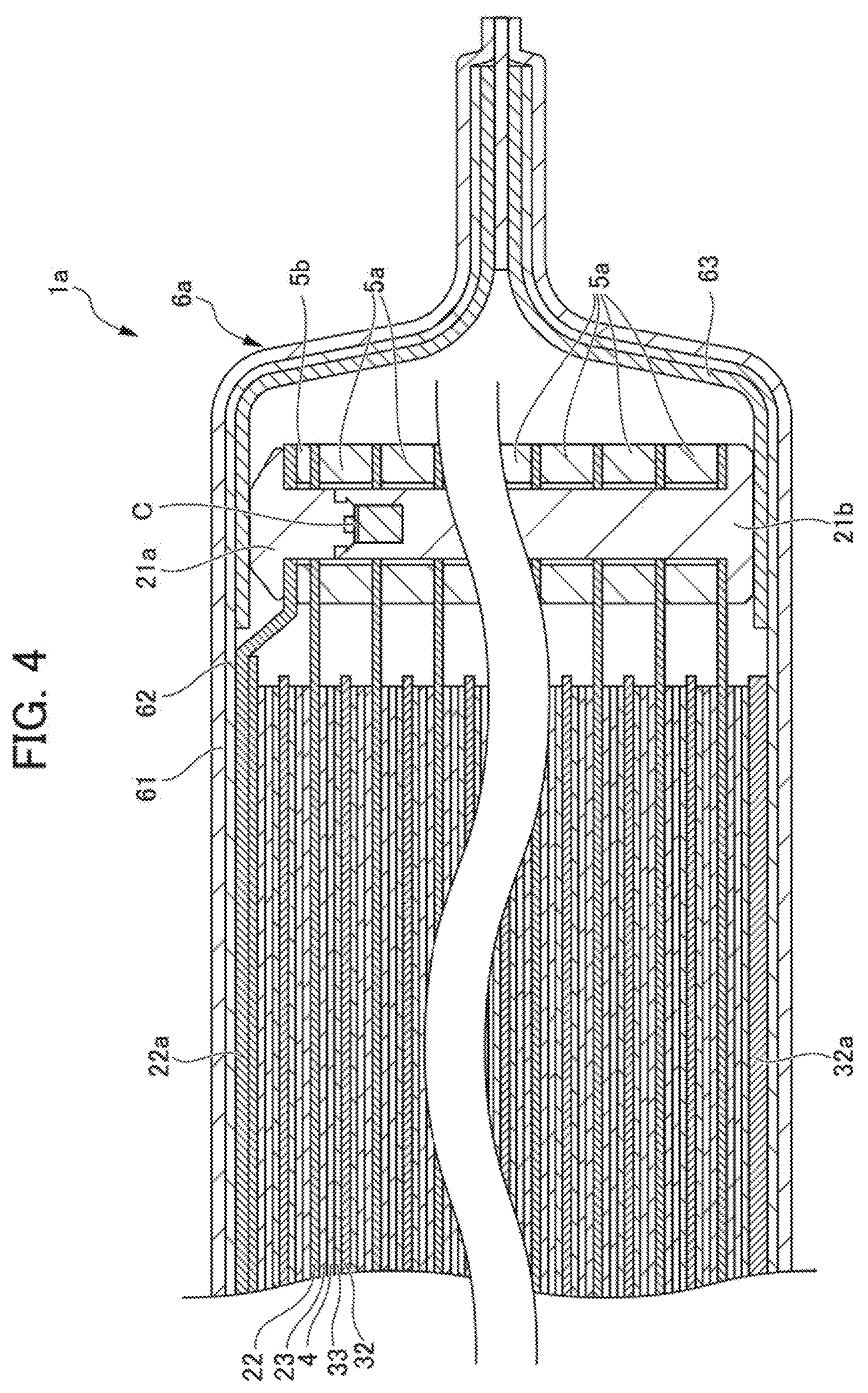
FIG. 4 is a cross-sectional view of a battery cell according to a second embodiment of the present invention.

As shown in FIG. 4, a battery cell 1*a* according to the present embodiment includes: a multilayer serving as a power generation element in which negative electrode current collectors 22, negative electrode active material layers 23, solid electrolyte layers 4, positive electrode current collectors 32 and positive electrode active material layers 33 are stacked; and an exterior 6*a* which stores negative electrode terminals 22*a* and 21*b* therewithin. Although FIG. 4, shows the exterior 6*a* which stores the negative electrode terminals 21*a* and 21*b* therewithin, the exterior 6*a* stores positive electrode terminals 31*a* and 31*b* in the same configuration.

Figure 5:
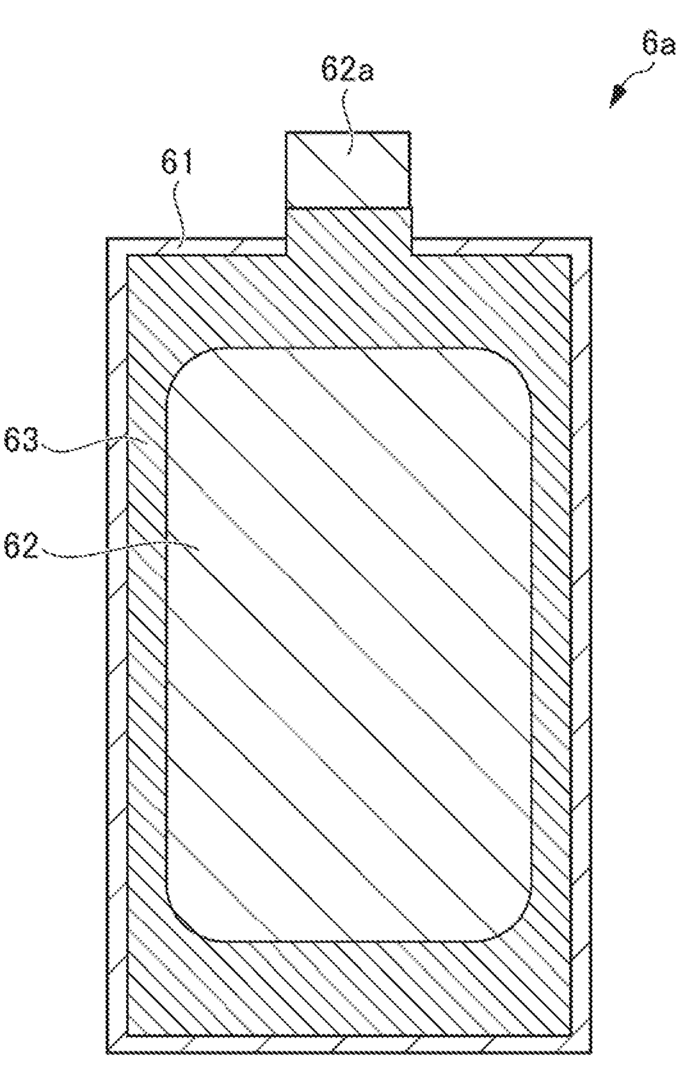
FIG. 5 is a schematic view when an exterior in the second embodiment of the present invention is seen from an abutment surface.

The exterior 6*a* includes a resin layer 61, a metal layer 62 which is a conductive layer and a resin layer 63. The resin layer 61 is an outermost layer in the battery cell 1*a*, and the resin layer 63 is an innermost layer in the battery cell 1*a*. As shown in FIG. 5, a part of the metal layer 62 is extended outside the battery cell 1*a* to form a lead terminal 62*a*. The lead terminal 62*a* is preferably electrically connected to the metal layer 62, and may be formed with a member different from the metal layer 62. Instead of the metal layer 62, a conductive material other than metal may be used.

As shown in FIG. 4, the metal layer 62 abuts on a negative electrode current collector 22*a* arranged on one stacking end surface of the multilayer. In this way, a current collected by the negative electrode terminals 21*a* and 21*b* can be passed through the negative electrode current collector 22*a* and the metal layer 62 to the lead terminal 62*a* shown in FIG. 5. The metal layer 62 likewise abuts on a positive electrode current collector 32*a* arranged on the other stacking end surface of the multilayer.

FIG. 5 is a schematic view when the exterior 6*a* is seen from the side of an abutment surface which abuts on the multilayer. As shown in FIG. 5, the metal layer 62 is arranged in a center portion of the abutment surface of the exterior 6*a*. The outer, perimeter of the metal layer 62 is covered by the resin layer 63. The area of the metal layer 62 on the abutment surface is increased, and thus it is possible to reduce electrical resistance. On the other hand, the resin layer 63 can preferably insulate an area between the negative electrode terminals 21*a* and 21*b* and the metal layer 62, and the area on the abutment surface is preferably minimized. In terms of the above description, the area of the metal layer 62 on the abutment surface is preferably larger than the area of the resin layer 63.

The exterior 6*a* having the configuration described above can be produced by removing, in a laminate film formed by stacking, for example, a resin layer, a metal layer and a resin layer in this order, the resin layer on one surface side. Instead of forming the lead terminal 62*a* in the exterior 6*a*, a part of the resin layer 61 may be removed to provide a lead terminal which is connected to the metal layer 62. In a conventional laminate cell, voids may be formed between a laminate film and a lead terminal, and this contributes to a decrease in airtightness. However, in the configuration of the lead terminal described above, as compared with the conventional laminate cell, the airtightness of the battery cell 1*a* can be enhanced. Instead of the configuration of the lead terminal described above, a part of the metal layer 62 may be extended to be exposed from, one end of the exterior 6*a* so as to form a lead terminal.

Since in the multilayer described above, a current is concentrated in the negative electrode current collector 22*a* and the positive electrode current collector 32*a* which abut on the metal layer 62, the negative electrode current collector 22*a* and the positive electrode current collector 32*a* are preferably greater in thickness than the negative electrode current collector 22 and the positive electrode current collector 32.

Although the preferred embodiments of the present invention have been described above, the details of the present, invention are not limited to the embodiments described above, and can be changed as necessary.

Although in the description of the above embodiments, the negative electrode current collectors 22 and the positive electrode current collectors 32 are extended from the respective current collectors, the present invention is not limited to this configuration. The negative electrode current collector 22 and the positive electrode current collector 32 are preferably drawn from the end surface of the multilayer, and may be drawn by being electrically connected to a different member.

EXPLANATION OF REFERENCE NUMERALS

1, 1*a* battery cell
20 negative electrode lead terminal (lead terminal)
30 positive electrode lead terminal (lead terminal)
21*a*, 21*b* negative electrode terminal (terminal)

31*a*, 31*b* positive electrode terminal (terminal)
22 negative electrode current collector (current collector)
32 positive electrode current collector (current collector)
221, 321 bent portion
5*a*, 5*b* shim (distance holder)
6, 6*a* exterior
62 conductive layer (metal layer)
63 resin layer

What is claimed is:

1. A battery cell comprising:

a power generation element that comprises a plurality of current collectors; and a terminal that is extended in a stacking direction of the current collectors and is electrically connected to the current collectors, wherein the terminal is inserted through holes formed in the current collectors, bent portions are formed at abutment parts of the current collectors that abut on the terminal, a distance holder is arranged between the current collectors and around the abutment parts, the battery comprises an exterior that stores the power generation element and the terminal therewithin, the exterior comprises a conductive layer on an abutment surface that abuts on a stacking end surface of the power generation element, the exterior comprises a resin layer that is a portion of the abutment surface and is arranged in an outer perimeter of the conductive layer on the abutment surface, the conductive layer on the abutment surface is larger in area than the resin layer on the abutment surface, and the resin layer on the abutment surface electrically insulates the conductive layer from the terminal.

2. The battery cell according to claim 1, wherein a current collector that abuts on the conductive layer has a thickness in the stacking direction that is greater than that of another current collector that does not abut on the conductive layer.

* * * * *